US008918489B2

(12) United States Patent
Hsu

(10) Patent No.: US 8,918,489 B2
(45) Date of Patent: Dec. 23, 2014

(54) MOBILE DEVICE, STORAGE MEDIUM, AND METHOD FOR AUTOMATICALLY CONNECTING THE MOBILE DEVICE TO SERVER

(75) Inventor: Shih-Wei Hsu, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 98 days.

(21) Appl. No.: 13/591,192

(22) Filed: Aug. 21, 2012

(65) Prior Publication Data

US 2013/0219032 A1 Aug. 22, 2013

(30) Foreign Application Priority Data

Feb. 16, 2012 (TW) .............................. 101105093 A

(51) Int. Cl.
*G06F 15/177* (2006.01)
*G06F 15/16* (2006.01)

(52) U.S. Cl.
USPC .......................................... 709/221; 709/228

(58) Field of Classification Search
CPC ............ G06F 11/3055; G06F 11/2038; G06F 11/2023
USPC .................. 709/221, 227–228, 230
See application file for complete search history.

(56) References Cited

U.S. PATENT DOCUMENTS

| 6,212,175 | B1 * | 4/2001 | Harsch ........................... 370/338 |
| 6,247,055 | B1 * | 6/2001 | Cotner et al. ................. 709/227 |
| 6,681,244 | B1 * | 1/2004 | Cross et al. ................... 709/203 |
| 7,027,808 | B2 * | 4/2006 | Wesby ........................... 455/419 |
| 7,031,654 | B2 * | 4/2006 | Yamaguchi ...................... 455/7 |
| 7,088,698 | B1 * | 8/2006 | Harsch .......................... 370/338 |
| 7,568,120 | B2 * | 7/2009 | Gale et al. ...................... 714/4.1 |
| 8,150,840 | B2 * | 4/2012 | Nachman ...................... 707/722 |
| 2011/0010560 | A1 * | 1/2011 | Etchegoyen ................. 713/189 |
| 2013/0219032 | A1 * | 8/2013 | Hsu ............................... 709/222 |

* cited by examiner

*Primary Examiner* — Lance L Barry
(74) *Attorney, Agent, or Firm* — Novak Druce Connolly Bove + Quigg LLP

(57) ABSTRACT

In a method for automatically connecting a mobile device to a server, an update command is periodically sent to a first server wirelessly connected to the mobile device after the mobile device enters a sleep mode. The update command requires a network status of the first server. The mobile device is waken when the network status is not acquired within a predetermined time period. Alternate servers are searched for to generate a list of server names. A target server is selected from the list, and a connection command is sent to the target server for establishing a connection between the mobile device and the target server. Network setting information is acquired from the target server. The connection between the mobile device and the target server is established according to the network setting information.

12 Claims, 3 Drawing Sheets

MOBILE DEVICE, STORAGE MEDIUM, AND METHOD FOR AUTOMATICALLY CONNECTING THE MOBILE DEVICE TO SERVER

BACKGROUND

1. Technical Field

Embodiments of the present disclosure relate to the field of wireless communications, and more particularly, to a mobile device, a storage medium, and a method for automatically connecting the mobile device to a server.

2. Description of Related Art

Sleep mode refers to a low power mode for mobile devices (e.g. mobile phones). When a mobile device enters the sleep mode, all unnecessary hardware and firmware of the mobile device are turned off to save power. Usually, the mobile device in the sleep mode maintains a connection with a server in order to receive requests from the server, such as phone call requests and short message service requests. However, if the mobile device in the sleep mode disconnects from the server, a user of the mobile device has to wake the mobile device manually and reconnect the mobile device to the server. It is inconvenient for the user to be always renewing a connection between the mobile device and the server.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. Some non-limiting examples of non-transitory computer-readable storage medium include CDs, DVDs, BLU-RAY, flash memory, and hard disk drives.

Figure 1:
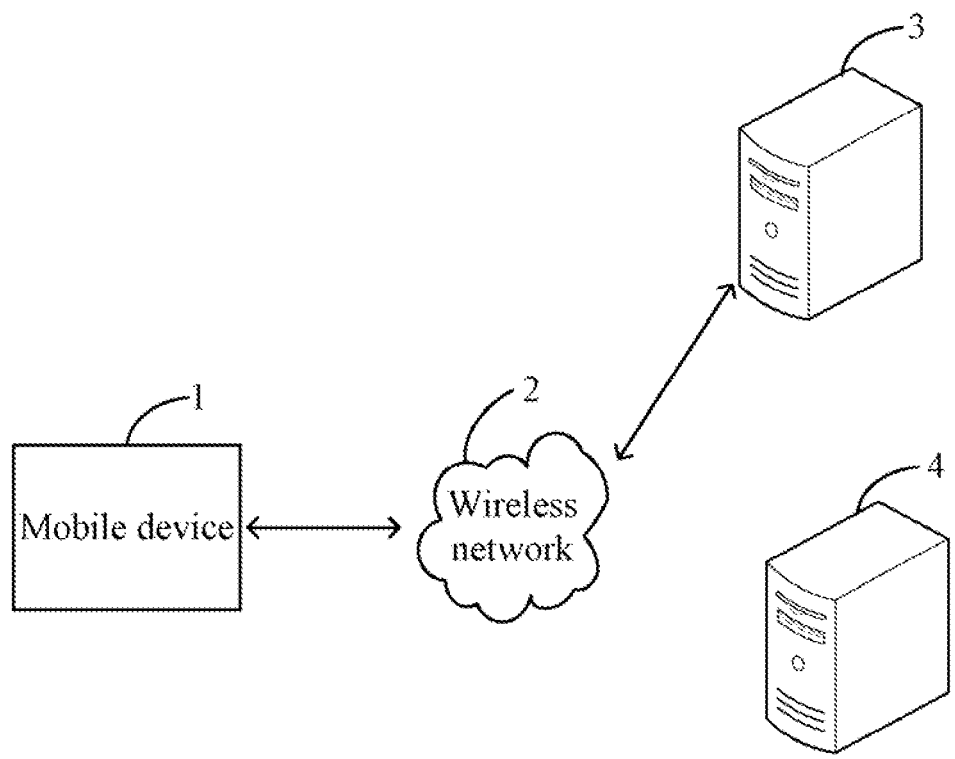
FIG. 1 is a schematic diagram of an exemplary network comprising a mobile device.

FIG. 1 is a schematic diagram of an exemplary network comprising a mobile device 1. In the embodiment, the mobile device 1 (e.g. mobile phone) connects to a first server 3 via a wireless network 2. The mobile device 1 can communicate with one or more electronic devices (not shown in FIG. 1), such as other mobile phones, personal digital assistants, handheld computers, or desktop computers. Each of these electronic devices is also connected to the first server 3. For example, the mobile device 1 receives phone calls or short messages from the electronic devices. The wireless network 2 may be, for example, wideband code division multiple access, universal mobile telecommunications system, BLUETOOTH, or worldwide interoperability for microwave access.

In addition, the wireless network 3 may further include alternate servers that are available for connection to the mobile device 1, but are not connected to the mobile device 1. In the embodiment, a second server 4 represents one of the alternate servers. If the mobile device 1 roams out of a coverage range of signals transmitted from the first server 3, and roams into a coverage range of signals transmitted from the second server 4, the mobile device 1 can connect to the second server 4 to maintain communications with the electronic devices.

Figure 2:
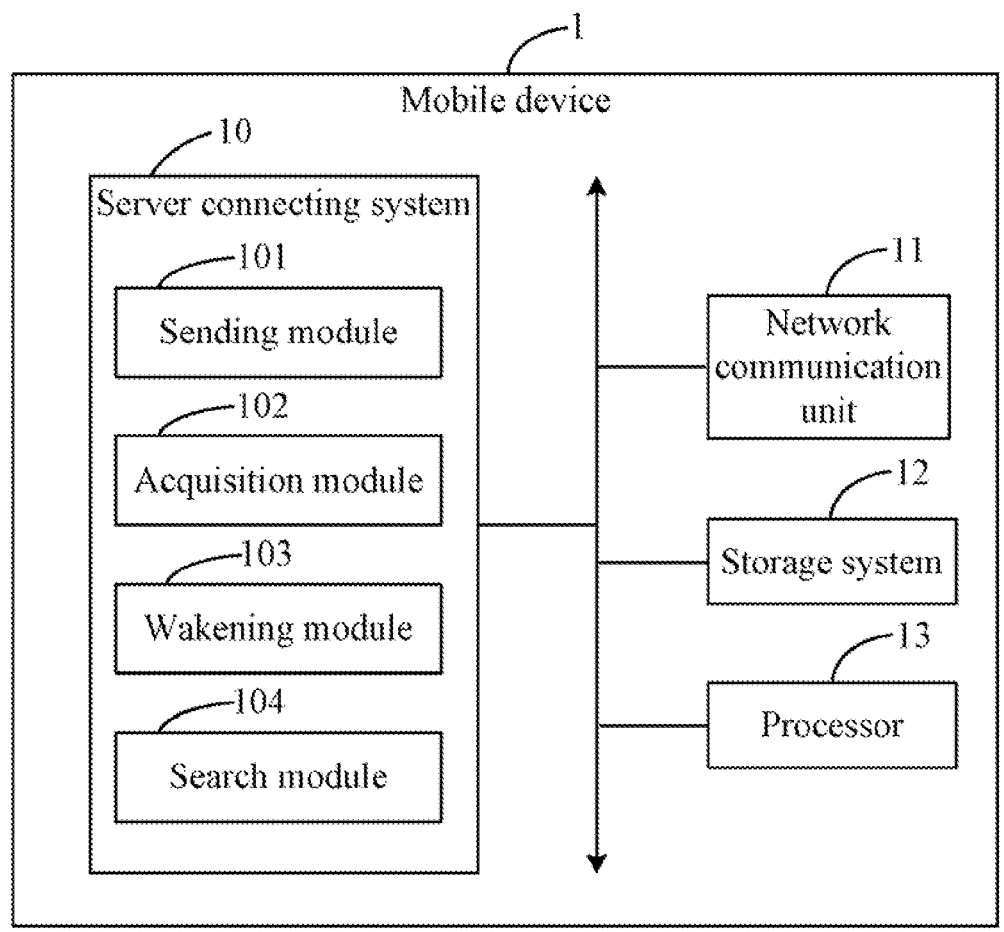
FIG. 2 is a block diagram of one embodiment of the mobile device of FIG. 1 including a server connecting system.

FIG. 2 is a block diagram of one embodiment of the mobile device 1 of FIG. 1 including a server connecting system 10. In the embodiment, the mobile device 1 further includes a network communication unit 11, a storage system 12, and at least one processor 13. The mobile device 1 can communicate with the first server 3 via the network communication unit 11. The server connecting system 10 may be in form of one or more programs that are stored in the storage system 12 and executed by the at least one processor 13. FIG. 2 is just one example of the mobile device 1 that can be included with more or fewer components than shown in other embodiments, or have a different configuration of the various components.

In one embodiment, the storage system 12 may be random access memory (RAM) for temporary storage of information, and/or a read only memory (ROM) for permanent storage of information. In other embodiments, the storage system 12 may also be an external storage device, such as a storage card or a data storage medium. The at least one processor 13 executes operations and applications of the mobile device 1, to provide functions of the mobile device 1.

In the embodiment, the server connecting system 10 is activated by the at least one processor 13 when the mobile device 1 enters a sleep mode. In the sleep mode, determined necessary hardware and firmware in the network communication unit 11 are kept running/operation in order to maintain a connection between the mobile device 1 and the first server 3. In the embodiment, the server connecting system 10 may include a sending module 101, an acquisition module 102, an wakening module 103, and a search module 104. The modules 101-104 may comprise a plurality of functional modules each comprising one or more programs or computerized codes that are stored in the storage system 12, and can be accessed and executed by the at least one processor 13. A detailed description of each module will be given in the following paragraphs.

Figure 3:
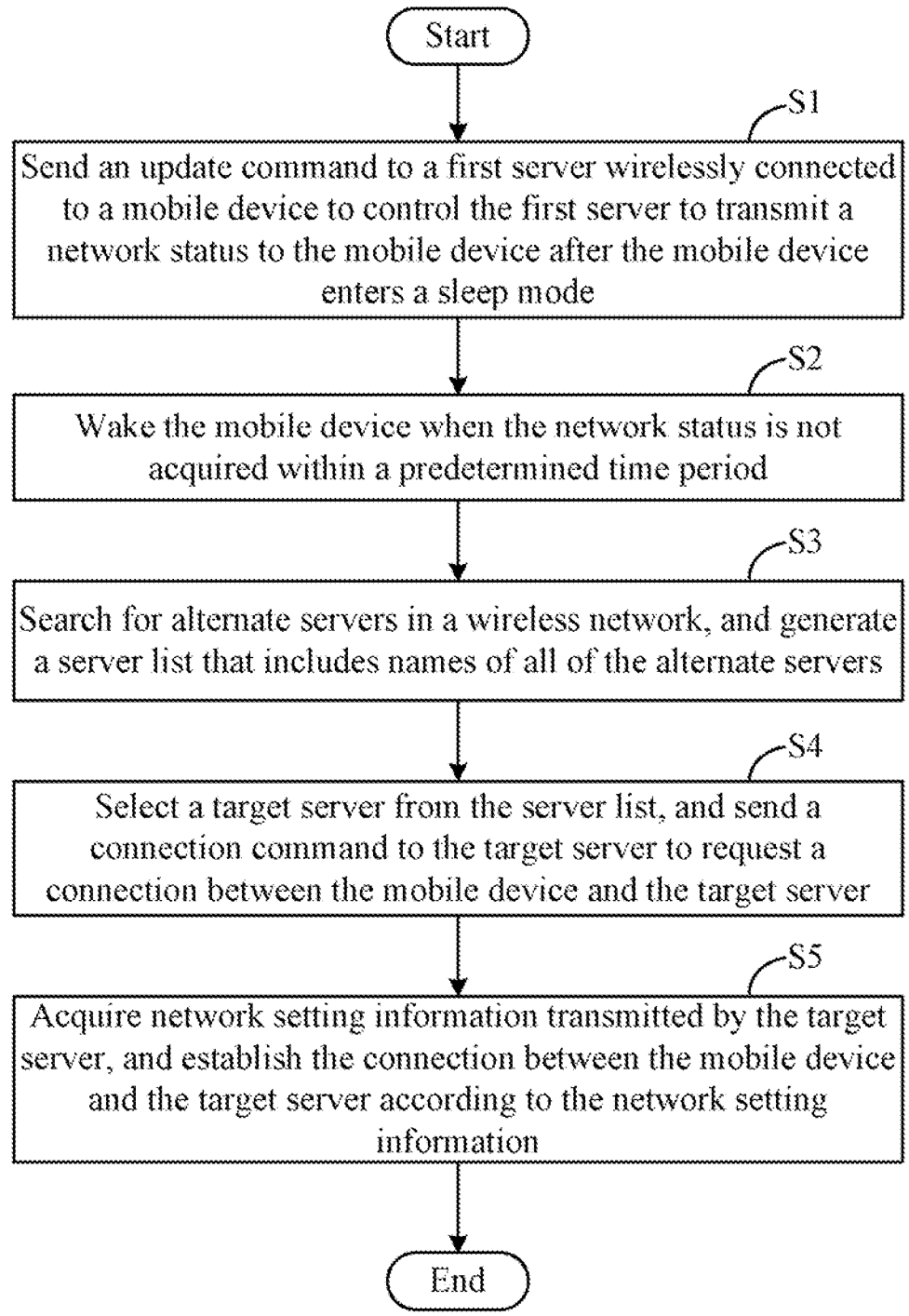
FIG. 3 is a flowchart of one embodiment of a method for automatically connecting the mobile device of FIG. 1 to a server.

FIG. 3 is a flowchart of one embodiment of a method for automatically connecting the mobile device 1 of FIG. 1 to a server. Depending on the embodiment, additional steps may be added, others removed, and the ordering of the steps may be changed.

In step S1, the sending module 101 periodically sends an update command to the first server 3 after the mobile device 1 enters a sleep mode. The update command controls the first server 3 to transmit a network status of the first server 3 to the mobile device 1. The network status may include an internet protocol (IP) address of the first server 3 and a period of the IP address.

The acquisition module 102 acquires the network status of the first server 3 transmitted by the first server 3. If the acquisition module 102 acquires the network status of the first server 3 within a first predetermined time period, such as five seconds, the acquisition module 102 determines that the mobile device 1 connects to the first server 3. If the acquisition module 102 does not acquire the network status of the first server 3 within the first predetermined time period, the acquisition module 102 determines that the mobile device 1 disconnects from the first server 3.

In step S2, the wakening module 103 wakes the mobile device 1 in the sleep mode when the acquisition module 102 does not acquire the network status of the first server 3 within the first predetermined time period. In one embodiment, the wakening module 103 wakes an operating system of the mobile device 1, and the operating system wakes all hardware and firmware of the mobile device 1.

In step S3, the search module 104 searches the wireless network 2 for alternate servers, and generates a server list. The server list includes names of all of the alternate servers. In the embodiment, each of the alternate servers has a signal coverage range that covers a location of the mobile device 1. If the mobile device 1 disconnects from the first server 3 but the mobile device 1 is not outside the signal coverage range of the first server 3, the server list may include a name of the original first server 3.

In step S4, the sending module 101 selects a target server from the server list, and sends a connection command to the target server to request a connection between the mobile device 1 and the target server. The target server may be the first server 3 or the second server 4. The target server may be one of the alternate servers that has strongest signal, or may be a first alternate servers in the server list.

In step S5, the acquisition module 102 acquires network setting information transmitted by the target server after the target server receives the connection command The network setting information may include an IP address and a domain name system of the target server. If the acquisition module 102 acquires the network setting information from the target server within a second predetermined time period, which may be the same period of time as the first predetermined time period, the acquisition module 102 establishes the connection between the mobile device 1 and the target server according to the network setting information. After the mobile device 1 connects to the target server, the mobile device 1 has full functionality in relation to the target server.

In one embodiment, the default action of the server connecting system 10 is to prevent the mobile device 1 from entering the sleep mode after the mobile device 1 disconnects from the first server 3 and before the mobile device 1 connects to the target server. However, the server connecting system 10 allows the mobile device 1 to enter the sleep mode in some specific conditions. For example, the server connecting system 10 allows the mobile device 1 to enter the sleep mode when the search module 104 cannot find any alternate servers, or when the acquisition module 102 acquires the network setting information from the target server within the second predetermined time period.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile device, comprising:
   at least one processor; and
   a storage system that stores one or more programs, which when executed by the at least one processor, cause the at least one processor to:
   periodically send an update command to a first server wirelessly connected to the mobile device after the mobile device enters a sleep mode, the update command controlling the first server to transmit a network status of the first server to the mobile device;
   wake up the mobile device when the network status of the first server is not acquired within a predetermined time period;
   search alternate servers in a wireless network, and generate a server list comprising names of all of the alternate servers, each of the alternate servers having a signal coverage range that covers a location of the mobile device;
   select a target server from the server list, and send a connection command to the target server to request a connection between the mobile device and the target server;
   acquire network setting information transmitted from the target server after the target server receives the connection command, and establish the connection between the mobile device and the target server according to the network setting information.

2. The mobile device of claim 1, wherein the network status comprises an Internet Protocol (IP) address of the first server and a period of the IP address.

3. The mobile device of claim 1, wherein the mobile device is allowed to enter the sleep mode when the search module does not find the alternate servers.

4. The mobile device of claim 1, wherein the mobile device is allowed to enter the sleep mode when the network setting information is acquired from the target server within the predetermined time period.

5. A method for automatically connecting a mobile device to a server, the method comprising:
   (a) sending an update command to a first server wirelessly connected to the mobile device after the mobile device enters a sleep mode, the update command controlling the first server to transmit a network status of the first server to the mobile device;
   (b) waking up the mobile device when the network status of the first server is not acquired within a predetermined time period;
   (c) searching for alternate servers in a wireless network, and generating a server list comprising names of all of the alternate servers, each of the alternate servers having a signal coverage range that covers a location of the mobile device;
   (d) automatically selecting a target server from the server list, and sending a connection command to the target server to request a connection between the mobile device and the target server;
   (e) acquiring network setting information transmitted from the target server after the target server receives the connection command, and establishing the connection between the mobile device and the target server according to the network setting information.

6. The method of claim 5, wherein the network status comprises an Internet Protocol (IP) address of the first server and a period of the IP address.

7. The method of claim 5, wherein the mobile device is allowed to enter the sleep mode when none of the alternate servers is found.

8. The method of claim 5, wherein the mobile device is allowed to enter the sleep mode when the network setting information is acquired from the target server within the predetermined time period.

9. A non-transitory storage medium storing a set of instructions, the set of instructions capable of being executed by a processor of a mobile device, causes the processor to execute a method for automatically connecting the mobile device to a server, the method comprising:
   (a) sending an update command to a first server wirelessly connected to the mobile device after the mobile device enters a sleep mode, wherein the update command controlling the first server to transmit a network status of the first server to the mobile device;
(b) waking up the mobile device when the network status of the first server is not acquired within a predetermined time period;
(c) searching for alternate servers in a wireless network, and generating a server list comprising names of all of the alternate servers, each of the alternate servers having a signal coverage range that covers a location of the mobile device;
(d) automatically selecting a target server from the server list, and sending a connection command to the target server to request a connection between the mobile device and the target server;
(e) acquiring network setting information transmitted from the target server after the target server receives the connection command, and establishing the connection between the mobile device and the target server according to the network setting information.

10. The storage medium of claim 9, wherein the network status comprises an Internet Protocol (IP) address of the first server and a period of the IP address.

11. The storage medium of claim 9, wherein the mobile device is allowed to enter the sleep mode when none of the alternate servers is found.

12. The storage medium of claim 9, wherein the mobile device is allowed to enter the sleep mode when the network setting information is acquired from the target server within the predetermined time period.

* * * * *